United States Patent [19]

Dail, Jr. et al.

[11] 4,088,083
[45] May 9, 1978

[54] ROTARY HARROW AND ATTACHMENTS

[75] Inventors: John P. Dail, Jr.; Pieter van den Berg, both of Wilson, N.C.

[73] Assignee: C. van der Lely N.V., Maasland, Netherlands

[21] Appl. No.: 739,299

[22] Filed: Nov. 5, 1976

[51] Int. Cl.² .................. A01B 49/06; A01B 33/16
[52] U.S. Cl. .................................. 111/13; 172/63; 172/68; 172/70; 172/72; 172/145; 172/146; 172/151; 172/187; 172/446
[58] Field of Search .................. 172/59, 47, 49, 63, 172/68, 70, 71, 72, 184, 189, 145, 146, 149, 150, 151, 175, 177; 111/52, 53, 59, 62, 63, 66, 70, 13

[56] References Cited

U.S. PATENT DOCUMENTS

| 2,739,517 | 3/1956 | Roberts | 172/72 X |
|---|---|---|---|
| 2,966,948 | 1/1961 | Ulsh | 172/72 |
| 3,316,865 | 5/1967 | Williams | 172/68 X |
| 3,667,551 | 6/1972 | Lely et al. | 172/59 |
| 3,826,314 | 7/1974 | Lely et al. | 172/59 |
| 3,885,633 | 5/1975 | Lely et al. | 172/68 |
| 3,930,542 | 1/1976 | Lely et al. | 172/59 |
| 3,983,943 | 10/1976 | Lely | 172/70 |

Primary Examiner—Paul E. Shapiro
Attorney, Agent, or Firm—Mason, Mason & Albright

[57] ABSTRACT

A tillage machine includes a main frame that supports rotary soil working tined members and various additional tools that can be detachably fastened to the main frame in combination with the rotary tined members to landscape in one pass. For primary use, a ripper assembly is detachably fastened at the front of the frame in advance of the rotary soil working members. A pulverizer-support roller is detachably fastened to the frame in a trailing position and a leveler bar supported between the roller and the rotary members to prevent ridging. A seed box with delivery system can be mounted on the roller frame and driven by a transmission connected to the roller axle. A packer roller is detachably pivoted to the frame to leave the ground in a finished condition.

8 Claims, 5 Drawing Figures

ROTARY HARROW AND ATTACHMENTS

The implement described herein is a rotary cultivator or harrow combined with other functional segments to be used for landscaping and similar purposes. Rotary implements of the type described in the patents listed below comprise soil working members with tines that are rotated about upwardly extending shafts. The soil working members are positioned side-by-side in a row that extends transverse to the direction of travel.

The objective of this invention is to provide a machine to be used for landscaping and similar purposes that can be operated and adjusted by one man and mechanically prepare the soil for cover crop, i.e., grass in a single pass without mixing the top-soil with the sub-soil. Instead of scarifying, disc harrowing, raking and seeding with many pieces of equipment, a single multi-purpose machine can accomplish the entire task of either primary or secondary tillage.

Figure 1:
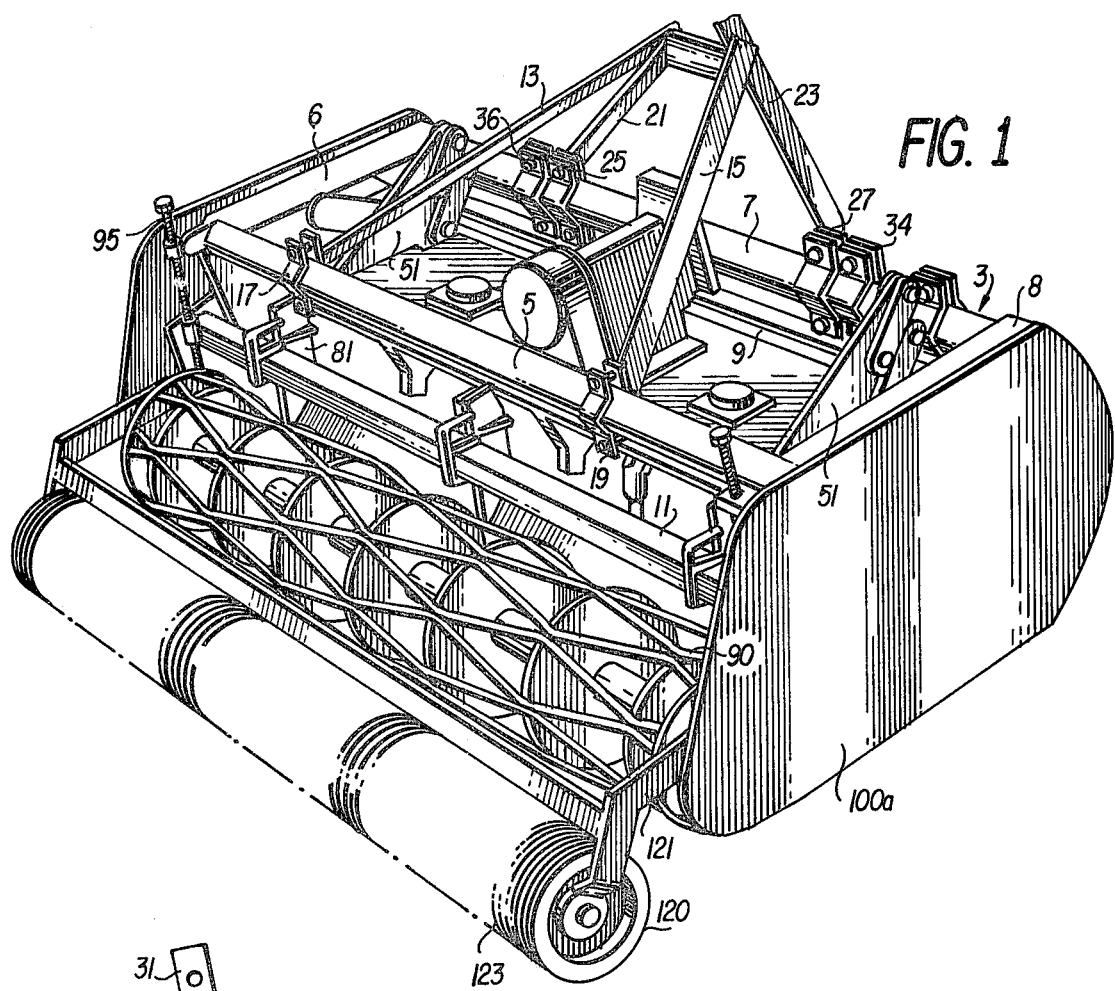
FIG. 1 is a perspective view of the machine with earth working tools attached.

The main frame 3 comprises an interconnected beam structure of hollow beams 5 and 7 that extend horizontally across the width of the machine and side beams 6 and 8. The beams of frame 3 are preferably multi-sided or square in cross section so that additional structures and/or tools can be detachably fastened to the main frame 3 with clamps. A trestle or coupling frame 10 has rearwardly diverging arms 13 and 15 fastened to upper beam 5 by respective bolted clamps 17 and 19. Forward arms 21 and 23 diverge downwardly and are fastened to beam 7 by further bolted clamps 25 and 27. The apex of the frame 10 is reinforced with a strut 29 and an apertured pair of lugs 31 (omitted from FIG. 1) that can be coupled to the upper link of a conventional three point tractor lifting device. By loosening clamps 17, 19, 25 and 27, the frame 10 can be shifted to the left or right of the center of frame 3 to offset the machine with respect to the prime mover.

To beam 7, a ripper assembly 33 is detachably secured, with downwardly extending arms 35 and 37 that are clamped to beam 7 by clamps 34 and 36 to support a lower horizontal beam 9. Along the length of beam 9, are shoe holders 37 within which ripper teeth 39 are fastened by pins that can be passed through any of a plurality of matching holes both in the holders and teeth 39. Three holders and teeth are shown, but there can be more or less and each tooth can be vertically adjusted within its holder by removing the pins (not shown) and sliding the tooth 39 up or down within its holder 37 until the appropriate holes can be matched. At the outer ends of beam 9, brace strips 41 extend rearwardly for connection by pins or bolts to apertured ears 43 on side beams 6 and 8 that interconnect beams 5 and 7. The entire ripper assembly 33, including beam 9 and arms 35, 37 and strips 41 can be readily and easily detached from the frame 3 by unbolting arms 35 and 37 from beam 7 and strips 41 from ears 43.

Figure 4:
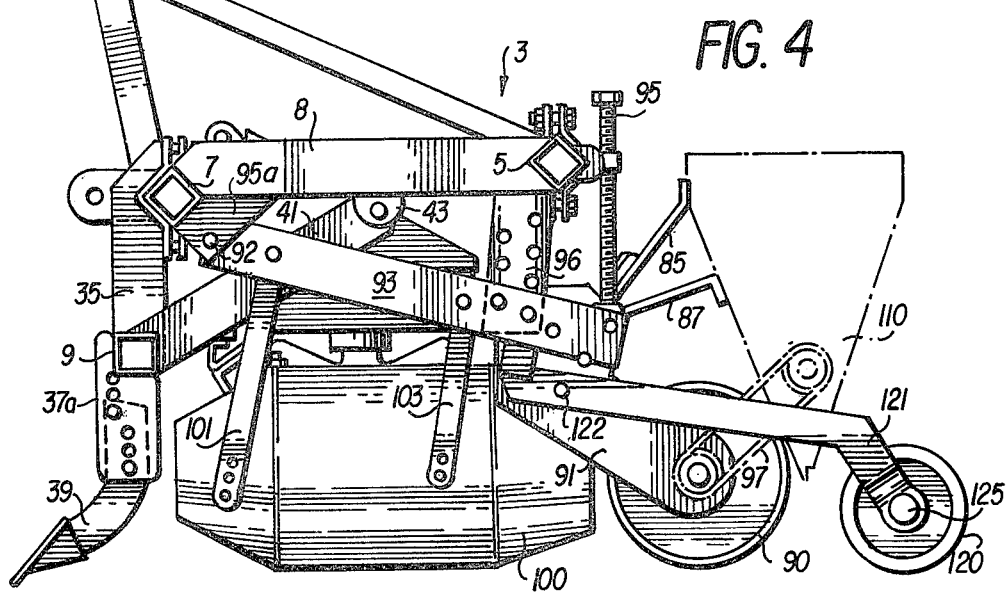
FIG. 4 is a side elevation of the machine with the tools and seeder attached for operation.
Figure 2:
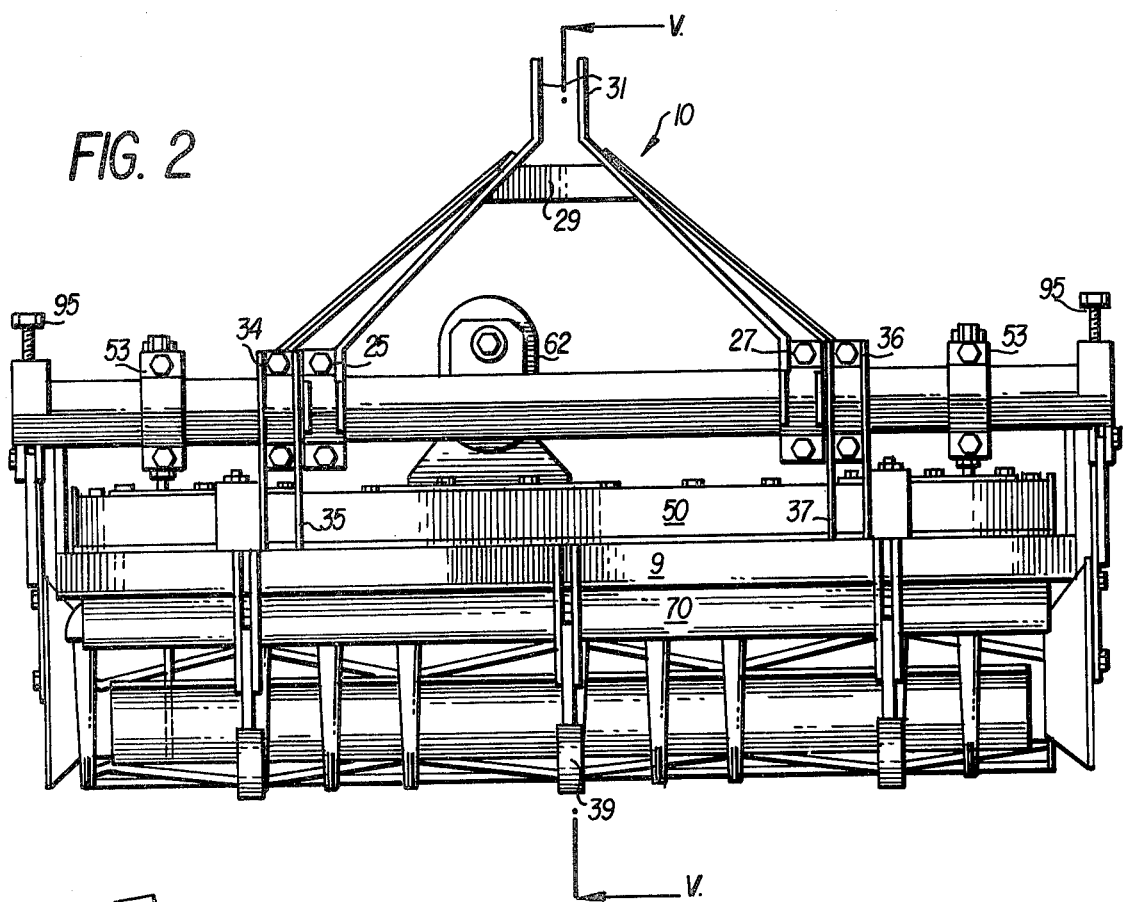
FIG. 2 is a front perspective view of the machine.
Figure 5:
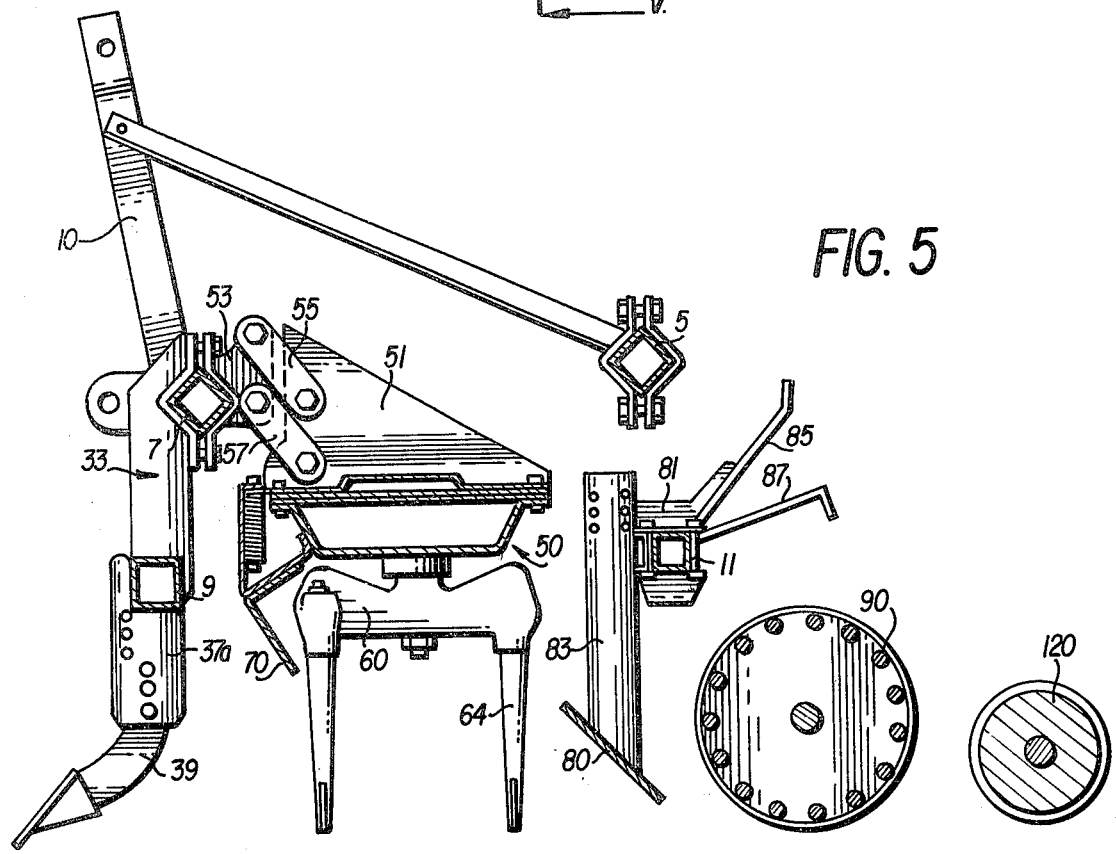
FIG. 5 is a section view taken along the lines V—V of FIG. 2.
Figure 3:
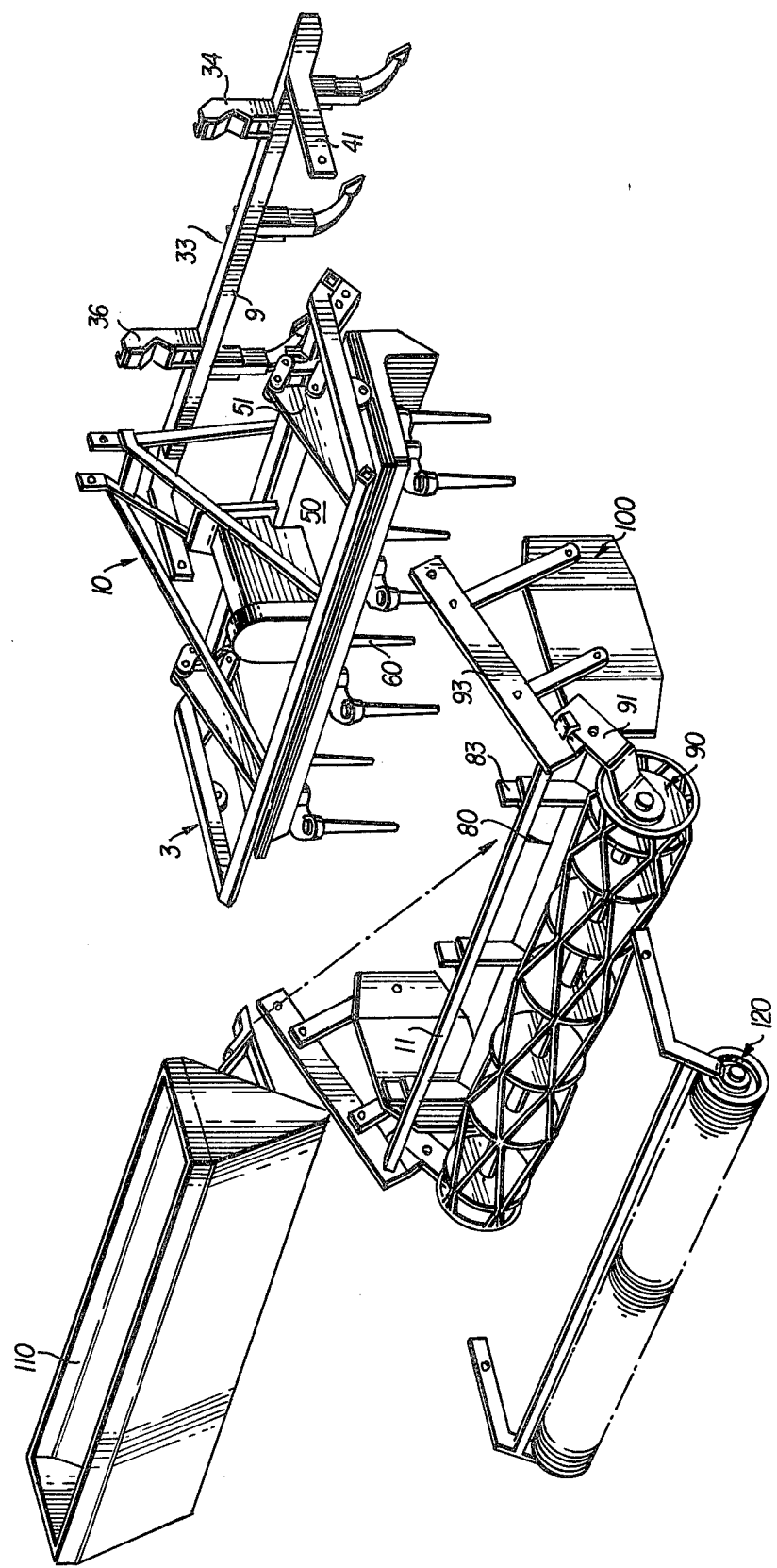
FIG. 3 is an explosed view of the FIG. 1 machine showing the various components that can be attached.

To beam 7, a frame portion 50 is attached through a linkage system similar to that of U.S. Pat. No. 3,885,633 (FIG. 4) and the linkage is afforded by substantially vertical brackets 51 connected to supports 53 on beam 7 via two spaced apart and parallel links 55 and 57 that are angled about midway between the horizontal and vertical. The leading ends of links 55 and 57 are located higher than their trailing ends and portion 50 can move up and down during operation to match ground undulations during travel. Frame portion 50 contains the drive connections for soil working rotary harrow members 60 which can be the same as disclosed in U.S. Pat. Nos. 3,885,633 or 3,841,411.

The drive to gear box 62 is conventional and can be the same as that disclosed in U.S. Pat. No. 3,821,989. Likewise, the tines 64 and their connections are known and reference is made to U.S. Pat. No. 3,809,166 and other patent disclosures listing Cornelis and/or any van der Lely as an inventor or inventors of related cultivators or rotary harrows.

A spring loaded guard element 70 is attached to portion 50 in a similar arrangement as that disclosed in U.S. Pat. No. 3,930,542 and for the same purpose.

A leveler bar or soil deflector plate 80 extends across the width of the machine immediately to the rear of soil working members 60. The plate 80 is mounted on brackets 81 detachably clamped to a further horizontal beam 11 and the vertical height of plate 80 can be adjusted with respect to the ground by means of matching hole connections between the shanks 83 and brackets 81.

A soil compressing and support roller 90 of the open cage type disclosed in U.S. Pat. Nos. 3,889,030 or 3,774,688 is journalled for rotation on arms 91 and the latter are interconnected to elongated arms 93 that extend forward to pivots 92 on apertured appendages 95a that web beams 6 and 8 to beam 7 at the sides of the machine. The diamond pattern shown in the drawings is used to enhance erosion control. Vertical adjustment of roller 90 can be effected by pivoting arms 93 with respect to the front of the frame 3 and inserting pins through matching holes in arms 93 and side brackets 96. The frame 3 can be vertically adjusted in a manner similar to that disclosed in U.S. Pat. No. 3,930,542 through the adjusting screws 95 which raise and lower the frame 3 relative to the rear of arms 93.

Side screens 100 with strip supports 101 and 103 depend from strips 93 that pivot the roller 90 to frame 3. The screens 100 thus are positioned at about the same level relative to the roller 90 during operation to contain the lateral displacement of soil regardless of the working depths of soil working members 60.

A dispenser for seed, or the like, 110 is detachably connected on brackets comprised of webbed upper and lower limbs 85 and 87 respectively that are bolted to beam 11. When in position, the box 110 is positioned to dispense seed or other material immediately to the rear of roller 90 and a chain drive 97 from the roller 90 can be connected to drive conventional delivery members (not shown).

A fertilizer and/or pesticide dispenser can be mounted on the front of the prime mover and driven as shown in U.S. Pat. No. 3,810,434 so that the materials can be worked and mixed in the soil by the rotating tines.

A packing roller 120 is mounted on arms 121, the front ends of which are secured to arms by pivots 122. The roller 120 includes corrugations 123 that can be formed by a series of individual ring components loosely mounted on axle shaft 125 to be self-cleaning. Alternatively, a smooth roller such as 39 in U.S. Pat. No. 3,616,862 or a spiked roller such as 36 in U.S. Pat. No. 3,902,437 can be used.

The coupling frame 10 is connectable to the three points of a conventional tractor lifting hitch and tilting of the entire machine can be accomplished by adjusting the link connected to lugs 31. Lengthening the link results in shallower penetration of the ripper teeth 39 while shortening the link results in deeper penetration and a front-wise tilt of frame portion 50. Less incorporation of the top soil surface results when the link is shortened.

In the use of the machine for primary tilling, the ripper assembly is clamped and bolted to main frame beam 7 and gear box 62 placed in driving connection to a conventional power take-off at the rear of a tractor to rotate the soil working members 60. Then, the pulverizer-support roller 90 is set at the desired height relative to frame 3 with the aid of pins and/or bolts when the appropriate holes of brackets 96 and arms 93 are in alignment. The roller 90 functions to control the working depths of the soil working members 60 and setting arms 93 about pivots 92 also positions leveler bar 80.

While bar 80 can be raised or lowered on shanks 83 relative to roller 90 to suit soil conditions, it is preferred to angle the flat bar 80 at about 45° with its upper leading edge in front of the lower trailing edge. The lower edge normally can be at about the same level as the bottom of roller 90.

With the bar 80 mounted about 2–8 inches in back of tines 64 and inclined as shown in the drawings, soil thrown rearwardly by rotating members 60 are deflected downwardly so that the roller can ride over and pulverize lumps. While roller 90 can and sometimes does carry soil up and over, the amount of displaced soil is not great and serves to cover any grass seed sown to a shallow depth of, say one-half inch.

The side shields 100 are also carried by the frame of roller 90 and are normally positioned immediately adjacent the sides of frame portion 50. The shields 100 can be raised or lowered to a limited extent on strip supports 101 and 103, but can be normally used with their bottom edges positioned slightly above the lower edge of leveler bar 80. Thus, the shields 100 function to contain soil displaced laterally by members 60 and side ridging is prevented. Without the shields 100, grass seed could be buried too deep to germinate. Side covers 100a can be used to improve the appearance of the machine.

The roller 90 can have a solid surface but it is preferred that the ground engaging periphery of the roller be rods or tubes with open diamond spaces or the rod helically mounted to mitigate soil erosion and to support the soil working members 60 at a constant working level in wet or sticky soil.

The seed box 110 can have one or several longitudinal compartments to contain and meter seed or other material. The feeder components within the box are conventional and can be driven by roller 90 via transmission 97. As seen in the drawings, seed is dispensed between pulverizer-support roller 90 and packer roller 120. The surface corrugations of roller 120 are preferred because they can be formed by a series of self-cleaning rings that penetrate the soil to a limited extent to help cover grass seed at shallow depths and further assist as an erosion control means.

It will be apparent that the entire ripper assembly and frame 33 can be quickly removed by disconnecting clamps 34 and 36 from beam 7. Thus, the ripper assembly is used in primary tillage to break hard-surfaced ground, but can be quickly removed in secondary tillage operations. If the soil working members 60 encounter hard soil, the portion 50 can pivot vertically within a range governed by the lengths of the link members 55 and 57 in the parallelogram linkage connected to beam 7. Thus, the soil working members "float" to adjust depending on soil conditions.

Likewise, the seed box 110 is quickly removable for soil working operation alone while the roller 90 can be easily adjusted to regulate the wroking depths of tines 64 by one operator with the turning of screw bolts 95 and repositioning of the pins and/or bolts that retain arms 93 in place.

Although certain features of the soil cultivating implements or cultivators that have been described and/or that are illustrated in the accompanying drawings will be set forth in the following claims as inventive features, it is emphasised that the invention is not necessarily limited to those features and that it includes within its scope each of the parts of each soil cultivating implement or cultivator that has been described and/or that is illustrated in the accompanying drawings both individually and in various combination.

We claim:

1. A tillage implement comprising a frame and a portion of said frame being supported by frame beams that extend in a direction transverse to the direction of travel, a plurality of soil working members being mounted on upwardly extending shafts that are connected to driving means supported by said frame portion, a ground engaging roller being located to the rear of said soil working members and said roller being pivotally interconnected to said frame by side arms with means that adjusts the relative position of said roller to said frame, a further beam supported between said arms and a downwardly depending leveler member being connected to the further beam, said leveler member being normally positioned forwardly of said roller and adjacent the rear of said soil working members to receive soil displaced by the soil working members in advance of the roller, pivot means detachably connecting said arms, together with said leveler member and roller, to the remainder of said implement.

2. The implement of claim 1, wherein said further beam is elongated and extends parallel to said frame beams.

3. The implement of claim 2, wherein said frame beams include a forward and a rear beam that are interconnected with side beams and said further beam is located below said rear beam.

4. The implement of claim 3, wherein a ripper assembly is detachably connected to said forward beams by fastening means and said assembly includes a foremost beam with ripper teeth depending from the forward frame beam, arm supports at the lateral sides of said foremost beam interconnecting said assembly to said frame.

5. The implement of claim 3, wherein a seed box is positioned above said roller and connected to said further beam by supports, said box having an opening that is located adjacent the rear of the roller.

6. The implement of claim 3, wherein said frame portion is interconnected to said frame beams by a parallelogram linkage comprised by two links that are angled to extend forwardly in the general direction of travel, the front ends of said links being located higher than the trailing ends thereof and said front ends being pivoted to said forward beam.

7. The implement of claim 1, wherein said leveler member is an elongated bar that has a flat side inclined between the horizontal and vertical, said leveler member having a lower trailing edge that is positionable at substantially the same level as the ground engaging surface of said roller.

8. The implement of claim 1, wherein a packer roller with mounting arms is positioned to trail said first mentioned roller and bear on the ground, said mounting arms being detachably connected to the side arms of the first mentioned roller.

* * * * *

UNITED STATES PATENT OFFICE
CERTIFICATE OF CORRECTION

Patent No. 4,088,083                     Dated  May 9, 1978

Inventor(s)  John P. Dail, Jr. et al.

It is certified that error appears in the above-identified patent and that said Letters Patent are hereby corrected as shown below:

On the Title Page, Item [73] should read:

--- Lely Corporation, Wilson, North Carolina ---.

Signed and Sealed this

Tenth Day of October 1978

[SEAL]

Attest:

RUTH C. MASON
*Attesting Officer*

DONALD W. BANNER
*Commissioner of Patents and Trademarks*